United States Patent
Soejima et al.

(10) Patent No.: US 8,566,008 B2
(45) Date of Patent: Oct. 22, 2013

(54) CONTROL DEVICE FOR INTERNAL COMBUSTION ENGINE

(75) Inventors: Shinichi Soejima, Gotenba (JP); Ken Koibuchi, Hadano (JP); Hirotada Otake, Nisshin (JP); Keisuke Kawai, Odawara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 362 days.

(21) Appl. No.: 12/993,922

(22) PCT Filed: May 29, 2009

(86) PCT No.: PCT/JP2009/059836
§ 371 (c)(1),
(2), (4) Date: Nov. 22, 2010

(87) PCT Pub. No.: WO2009/154065
PCT Pub. Date: Dec. 23, 2009

(65) Prior Publication Data
US 2011/0087421 A1 Apr. 14, 2011

(30) Foreign Application Priority Data
Jun. 19, 2008 (JP) ................. 2008-160870

(51) Int. Cl.
G06F 19/00 (2011.01)
(52) U.S. Cl.
USPC .............. 701/110; 123/406.23; 123/406.24
(58) Field of Classification Search
USPC .............. 701/101–103, 110, 114, 115; 123/406.23, 406.24, 406.25, 406.5, 123/436, 492, 493
See application file for complete search history.

(56) References Cited

U.S. PATENT DOCUMENTS

| | | | |
|---|---|---|---|
| 7,493,207 B2* | 2/2009 | Yasui et al. | 701/103 |
| 8,272,367 B2* | 9/2012 | Shikama et al. | 123/436 |
| 2009/0037066 A1 | 2/2009 | Kuwahara et al. | |
| 2010/0116247 A1* | 5/2010 | Shikama et al. | 123/399 |

FOREIGN PATENT DOCUMENTS

| | | |
|---|---|---|
| DE | 102005042650 A1 | 3/2007 |
| JP | A-03-015643 | 1/1991 |
| JP | A-11-022515 | 1/1999 |
| JP | A-2006-070701 | 3/2006 |
| JP | A-2006-257954 | 9/2006 |
| JP | A-2007-297992 | 11/2007 |
| WO | WO 2007/055144 A1 | 5/2007 |

OTHER PUBLICATIONS

International Preliminary Report on Patentability issued in Application No. PCT/JP2009/059836; Dated Mar. 10, 2011.
International Search Report issued in Application No. PCT/JP2009/059836; Dated Jul. 7, 2009 (With Translation).

* cited by examiner

Primary Examiner — John Kwon
(74) Attorney, Agent, or Firm — Oliff & Berridge, PLC

(57) ABSTRACT

A control device for an internal-combustion engine designed to ensure that required responsiveness is obtained as actual torque responsiveness with respect to a torque demand even when the torque responsiveness with respect to the actuation of a particular actuator is affected by the operating conditions. A response compensating filter is provided at a preceding stage to an air inverse model, and the target torque which has been corrected by the response compensating filter is converted by the air inverse model to obtain a target opening degree of a throttle. A time constant of the response compensating filter is set on the basis of the operating conditions of the internal-combustion engine so that the responsiveness of actual torque with respect to the torque demand reaches a preset standard responsiveness.

2 Claims, 8 Drawing Sheets

CONTROL DEVICE FOR INTERNAL COMBUSTION ENGINE

FIELD OF THE INVENTION

This invention relates to a control device for an internal-combustion engine. Especially this invention relates to a control device for an internal-combustion engine provided with an actuator wherein the responsiveness of torque with respect to its actuation changes with operating conditions.

BACKGROUND OF THE INVENTION

The torque output from an internal-combustion engine can be adjusted by controlling the actuation of actuators such as a throttle. However, some actuators containing a throttle are known for the responsiveness of torque with respect to their actuation changing with the operating conditions of an internal-combustion engine. For example, JP2006-257954A describes that the engine rotational speed response with respect to throttle operation is good under unloaded condition of an internal-combustion engine as compared with under loaded condition.

The art currently indicated by JP2006-257954A is an art related to a fuel injection system which computes a target engine rotational speed based on a throttle indicated value and controls a fuel injection amount according to the target engine rotational speed. In order to cancel the difference in the engine rotational speed response depending on the presence or absence of load, said art is trying to change a coefficient used for filtering of the target engine rotational speed between unloaded condition and loaded condition.

DESCRIPTION OF THE INVENTION

Problem to be Solved by the Invention

The art given in the above-mentioned document is an art related to an internal combustion engine for a ship, and controls the actuation of an actuator based on a target engine rotational speed. On the other hand, in an internal-combustion engine for a vehicle, what is called torque demand control is used. By the torque demand control, a demand to the internal-combustion engine is expressed in torque, and the operation of an actuator is controlled to realize a target torque set up based on the torque demand. The torque demand is output from various demand sources such as a vehicle slipping prevention control system and a gearbox.

The torque demand control is preferred when carrying out the overall integrated control of a vehicle containing an internal-combustion engine. However, if the responsiveness of torque with respect to the actuation of an actuator changes with operating conditions, a difference will arise in the responsiveness of actual torque with respect to identical torque demands. In this case, there is a possibility that a demand to an internal-combustion engine may not be appropriately consistent with a demand to other control elements such as a braking system, and it may become impossible to attain the required effect of the overall integrated control of a vehicle.

As an approach for preventing the mismatching between a demand to an internal-combustion engine and a demand to other control elements in the overall integrated control of a vehicle, pre-adjusting a way for outputting demands to each control element including torque demands to the internal-combustion engine by a fitting work may be useful. If the responsiveness of torque with respect to the actuation of an actuator changes with the operating conditions of the internal-combustion engine, a way for outputting demands should be pre-adjusted in accordance with each of the available operating conditions. However, that approach may require a large amount of man-hour for the fitting work. Moreover, it is not always possible to conduct the fitting work about all operating conditions. The overall control performance of the vehicle may be affected by the operating conditions of the internal-combustion engine.

Because of the structure of the internal-combustion engine, it is unavoidable that the responsiveness of torque with respect to the actuation of a particular actuator changes with operating conditions. However, it is possible to adjust the responsiveness of actual torque with respect to a torque demand by a computer processing performed within the control device for the internal-combustion engine. If the responsiveness of actual torque with respect to the torque demand can be made into the required responsiveness assumed beforehand, the man-hour for the fitting work will be substantially reduced, and the torque responsiveness will be no longer affected by the operating conditions of the internal-combustion engine, thereby the overall control performance of the vehicle can also be improved.

The present invention has been made in order to solve the above-mentioned problem. It is an object of the present invention to provide a control device for an internal-combustion engine designed to ensure that required responsiveness is obtained as the responsiveness of actual torque with respect to a torque demand even when the responsiveness of torque with respect to the actuation of a particular actuator is affected by operating conditions.

Means for Solving the Problem

In order to attain the object described above, a first aspect of the present invention is a control device for an internal-combustion engine which is provided with an actuator actuated in response to an input of a control signal, wherein the torque output from said internal-combustion engine is adjusted in accordance with the actuation of said actuator and the responsiveness of torque with respect to the actuation of said actuator changes with the operating conditions of said internal-combustion engine, said control device comprising:

target torque set means which receives a demand for the torque output from said internal-combustion engine and sets a target torque of said internal-combustion engine based on the torque demand;

conversion means which converts the target torque into the control signal for said actuator; and target torque correction means which corrects the target torque input into said conversion means on the basis of the operating conditions of said internal-combustion engine so that the responsiveness of actual torque with respect to the torque demand is adjusted to preset standard responsiveness.

A second aspect of the present invention is the control device for the internal-combustion engine according to the first aspect of the present invention, further comprising:

correction limit means which judges whether the torque demand used for setting the target torque includes a component generated from a particular torque demand source, and limits the target torque correction by said target torque correction means in the case of a particular judgment result.

A third aspect of the present invention is the control device for the internal-combustion engine according to the first or second aspect of the present invention, further comprising:

correction permission means which permits the target torque correction by said target torque correction means when particular operating conditions are satisfied as the operating conditions of said internal-combustion engine.

A fourth aspect of the present invention is the control device for the internal-combustion engine according to the third aspect of the present invention, wherein said correction permission means permits the target torque correction by said target torque correction means when said internal-combustion engine is operated in a predetermined rotational speed range.

A fifth aspect of the present invention is the control device for the internal-combustion engine according to any one of the first to fourth aspects of the present invention, wherein said standard responsiveness is set to certain fixed responsiveness.

A sixth aspect of the present invention is the control device for the internal-combustion engine according to any one of the first to fourth aspects of the present invention, wherein said standard responsiveness is changed according to the engine rotational speed of said internal-combustion engine.

A seventh aspect of the present invention is the control device for the internal-combustion engine according to any one of the first to sixth aspects of the present invention, wherein said target torque correction means includes:

a first-order-lag filter into which the target torque is input; and time constant change means which changes the time constant of said first-order-lag filter according to the operating conditions of said internal-combustion engine.

Effect of the Invention

In the first aspect of the present invention, the responsiveness of torque with respect to the operation of the actuator is affected by the operating conditions of the internal-combustion engine, and the responsiveness of torque with respect to the torque demand is affected by not only the operating conditions of the internal-combustion engine but also the setting of the target torque used as the basis of the control signal. For this reason, the influence which the operating conditions have on the torque responsiveness is cancelable by correcting the target torque based on the operating conditions of the internal-combustion engine. According to the first aspect of the present invention, the target torque is corrected on the basis of the operating conditions of the internal-combustion engine, and the actuator is actuated according to the control signal changed from the corrected target torque. Therefore, by presetting required responsiveness as the standard responsiveness, it becomes possible to obtain the required responsiveness without being affected by the operating conditions.

According to the second aspect of the present invention, it is possible to switch the limitation of the target torque correction ON and OFF depending on whether the torque demand used for setting the target torque includes the component generated from the particular torque demand source. This makes it possible to realize the optimal torque control according to the contents of the torque demanded.

According to the third aspect of the present invention, it is possible to switch the permission of the target torque correction ON and OFF depending on whether the particular operating conditions are satisfied. This makes it possible to realize the optimal torque control according to the operating conditions.

According to the fourth aspect of the present invention, the responsiveness of actual torque with respect to the torque demand can be corresponded with the standard responsiveness in the predetermined rotational speed range, and the responsiveness of actual torque with respect to the demand can be made into the responsiveness according to the operating conditions of the internal-combustion engine out of the predetermined rotational speed range.

According to the fifth aspect of the present invention, the responsiveness of actual torque with respect to the torque demand can be made into the fixed responsiveness without depending on the operating conditions of the internal-combustion engine.

According to the sixth aspect of the present invention, the responsiveness of actual torque with respect to the torque demand can be made into the responsiveness appropriate to the engine rotational speed of the internal-combustion engine.

According to the seventh aspect of the present invention, the response speed of the target torque with respect to the torque demand can be delayed by letting the target torque pass in the first-order-lag filter. The response speed is decided by the time constant of the first-order-lag filter. In this aspect of the present invention, the responsiveness of actual torque with respect to the torque demand can be adjusted to the standard responsiveness by changing the time constant according to the operating conditions of the internal-combustion engine.

BEST MODE OF CARRYING OUT THE INVENTION

First Embodiment

The first embodiment of the present invention will be described with reference to figures.

The control device of the present embodiment is applied to a internal-combustion engine of a spark ignition type provided with a throttle. The throttle is an actuator installed in an intake pipe of the internal-combustion engine, and can adjust the air amount (air amount per 1 cycle) inhaled in cylinders with its opening. The internal-combustion engine concerning the present embodiment is equipped with a surge tank in the intake pipe, and has the throttle upstream of the surge tank.

Since the air amount is a factor which determines the output torque of the internal-combustion engine, the torque of the internal-combustion engine can be controlled by controlling the opening of the throttle. However, since there is a volume space containing the surge tank between the throttle and the cylinder, a response delay occurs in the change of the inhaled air amount after the opening of the throttle changes. For this reason, the torque of the internal-combustion engine will also change with a delay with respect to the actuation of the throttle.

Figure 2:
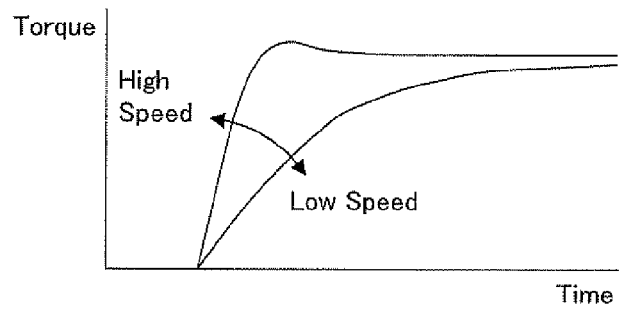
FIG. 2 is a figure for explaining the influence which engine rotational speed has on a torque response.

The responsiveness of torque with respect to the actuation of the throttle is affected by the operating conditions of the internal-combustion engine. Especially, the rotational speed (number of rotations per unit time) of the internal-combustion engine significantly affects the torque responsiveness. The graph of FIG. 2 shows the time variation of torque prevailing when the throttle opening is changed equally at each of high rotational speed and low rotational speed. As shown in this figure, the torque response at high rotational speed is quick, and the torque response at low rotational speed is slow. If the response of torque with respect to the actuation of the throttle is approximated by a first-order-lag element, it can be said that the time constant is small at high rotational speed and is large at low rotational speed.

The control device of the present embodiment is a torque demand type control device which controls the internal-combustion engine based on the torque demand from the superior control device which carries out the overall integrated control of the vehicle. In the integrated control of the vehicle, a target control result is set up according to the operation conditions of the vehicle, and a demand is given to each control element so that the control result may be obtained. The torque demand given to the internal-combustion engine is also one of such demands. The rule which specifies how to give the demand to each control element is designed by use of a fitting work in the design stage of a control system. In the fitting work, a response delay before the demand given to each control element is realized is taken into consideration.

The control device of the present embodiment controls the actuation of the throttle directly. However, the responsiveness of torque with respect to the actuation of the throttle is affected by the operating conditions of the internal-combustion engine as mentioned above. For this reason, if the actuation of the throttle is uniformly controlled with respect to the torque demand, the responsiveness of actual torque with respect to the torque demand will also be affected by the operating conditions of the internal-combustion engine. About this point, the control device of the present embodiment is designed to be capable of making the responsiveness of actual torque with respect to the torque demand into the required responsiveness assumed beforehand by performing predetermined computation inside the control device as described in detail below.

Figure 1:
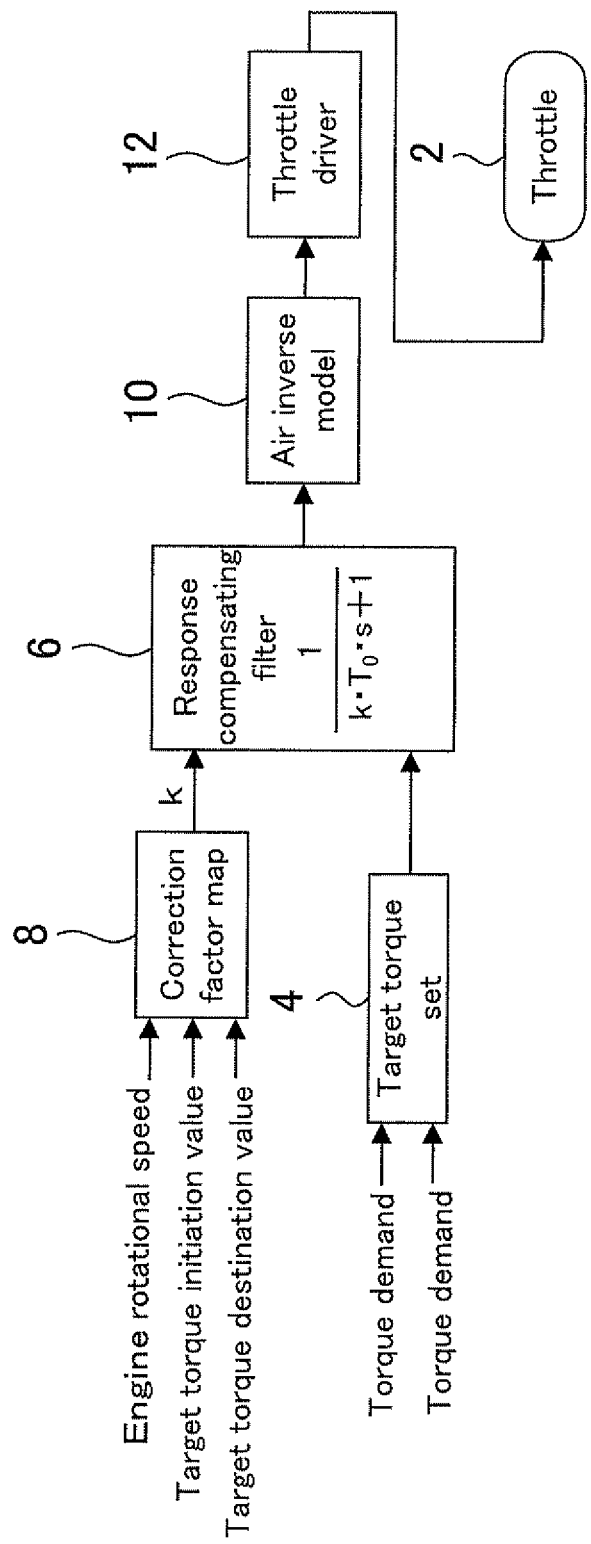
FIG. 1 is a block diagram showing the configuration of a control device for an internal-combustion engine as a first embodiment of the present invention.

Hereafter, the configuration and function of the control device of the present embodiment are explained using FIGS. 1, 3-6. FIG. 1 is a block diagram showing the configuration of the control device of the present embodiment. The control device of the present embodiment controls the actuation of the throttle 2 based on the torque demand generated from the superior control apparatus not shown in the figure. The throttle 2 of the present embodiment is an electronic controlled type, and is actuated by the throttle motor. The control of the actuation of the throttle 2 is directly performed by a throttle driver 12. The throttle driver 12 receives the target opening of the throttle 2 from an upstream calculation element, changes it into an opening command value which is a control signal, and outputs it to the throttle 2.

An air inverse model 10 is used for calculation of a target opening of the throttle 2. The air inverse model is equal to calculating conversely an air model which is obtained by modeling the response of air amount with respect to the actuation of the throttle based on hydrodynamics etc. and expressing this with mathematical expressions. The air inverse model 10 of the present embodiment is also equipped with a function to change a target torque into a target air amount. The target air amount is the air amount required for realization of the target torque. A torque to air amount conversion map is used for conversion of the target torque to the target air amount. In this map, various kinds of operating conditions which influence the relation between torque and air amount, such as ignition timing, engine rotational speed and air-fuel ratio, are used as parameters.

By inputting the target torque into the air inverse model 10, the air amount required for realization of the target torque is computed, and the throttle opening for realizing the air amount is outputted. However, there are many kinds of actuations of the throttle 2 which can result in realization of the target torque eventually. The air inverse model 10 used by the present embodiment is the model of the actuation of the throttle 2 for realizing the target torque at the fastest speed. Specifically, the throttle opening is changed in the form of the overshoot with respect to the target opening. Since each of the air model and air inverse model is publicly known and is not a characteristic part of this invention in itself, the detailed explanation about the model is omitted here.

The target torque of the internal-combustion engine is set by a target torque set part 4. The target torque set part 4 mediates various kinds of torque demands to the internal-combustion engine, and outputs the torque value obtained by the mediation as the target torque of the internal-combustion engine. Mediation here is an operation which acquires one numerical value from two or more numerical values in accordance with the calculation rule defined beforehand. The numerical values mediated belong to the same kind of physical quantity. Also, the numerical value acquired by the mediation becomes the same kind of physical quantity as the numerical values mediated. Here, torque is used as the physical quantity of the target of the mediation. The calculation rule used for the mediation includes, for example, selecting a maximum value, selecting a minimum value, averaging, or summing. A plurality of these calculation rules may be appropriately combined together. Torque demands mediated include not only the torque which a driver demands via an accelerator operation but also the torque demanded from the vehicle control system such as VSC (Vehicle Stability Control system), TRC (Traction Control system), ACC (Adaptive Cruise Control system) and the like.

The control device of the present embodiment is provided with a response compensating filter 6 between the target torque set part 4 and the air inverse model 10. The target torque set by the target torque set part 4 is not input into the air inverse model 10 as it is, but after being processed with the response compensating filter 6, it is input into the air inverse model 10. The response compensating filter 6 is installed in order to compensate the torque responsiveness affected by the operating conditions of the internal-combustion engine.

The computing equation indicated in the block which represents the response compensating filter 6 in FIG. 1 is a transfer function which describes the composition of the response compensating filter 6. As shown in this computing equation, a first-order-lag element is used as the response compensating filter 6. In this first-order-lag element, a standard time constant $T_o$ and a correction factor k for correcting it are defined.

By the response compensating filter 6 described above being installed in front of the air inverse model 10, the target torque input into the air inverse model 10 has a response delayed according to the time constant $kT_o$ with respect to the torque demand. And in the air inverse model 10, the target opening of the throttle 2 will be computed based on the target torque which had the response delayed to the torque demand. The target opening computed by the air inverse model 10 is changed into an opening command value in the throttle driver 12, and is outputted to the throttle 2. The torque of the internal-combustion engine will change towards the target torque by actuating the throttle 2 according to the opening command value.

As mentioned above, the control device of the present embodiment has the first-order-lag element as the calculation element. The response of torque with respect to the actuation of the throttle 2 can be approximated by a first-order-lag element, too. For this reason, the internal-combustion engine to which the control device of the present embodiment is applied includes two first-order-lag elements in the system realizing the torque demand via the actuation of the throttle 2. In this case, the responsiveness of actual torque with respect to the torque demand can be represented with two time constants.

The time constant which shows the response of torque with respect to the actuation of the throttle 2 (henceforth, intake response time constant) changes with the operating conditions of the internal-combustion engine as mentioned above. For this reason, if the time constant $kT_o$ of the response compensating filter 6 is immobilized, the responsiveness of actual torque with respect to the torque demand will also change with the operating conditions of the internal-combustion engine after all. However, if the time constant $kT_o$ of the response compensating filter 6 can be adjusted suitably, thereby cancelling the change of the intake response time constant with the operating conditions of the internal-combustion engine, the responsiveness of actual torque with respect to the torque demand could be adjusted to required responsiveness.

Figure 3:
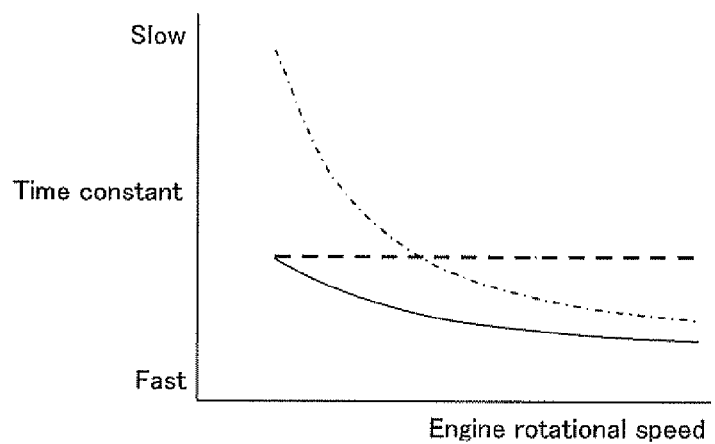
FIG. 3 is a figure for explaining the torque response characteristic realized with the configuration of the first embodiment of the present invention.

FIG. 3 is a figure showing with a graph how the time constant of the first-order-lag element by which the response of actual torque with respect to the torque demand is approximated changes with the engine rotational speed of the internal-combustion engine. Among the relations between the time constant and the engine rotational speed shown in FIG. 3, the relation indicated by a solid line and the relation indicated by a dashed-dotted line are relations prevailing when filtering is not performed to the target torque. The difference between both lines is based on the air inverse model currently used. As mentioned above, the air inverse model 10 of the present embodiment is designed to realize the target torque at the fastest speed by changing the throttle opening in the form of the overshoot with respect to the target opening. Here, it is presupposed that the relation between the constant and the engine rotational speed indicated by the solid line in FIG. 3 is the relation realized by use of the air inverse model 10.

The time constant corresponding to the solid line in FIG. 3 is the minimum time constant realizable in each engine rotational speed, and corresponds to the time constant prevailing when the time constant $kT_o$ of the response compensating filter 6 is made into zero. When the time constant $kT_o$ of the response compensating filter 6 is set to a larger value than zero, the time constant in FIG. 3 becomes larger than the time constant indicated by the solid line, and the response of actual torque with respect to the torque demand becomes slow. However, if the time constant $kT_o$ of the response compensating filter 6 is adjusted according to the engine rotational speed, the whole time constant can be uniformly arranged as indicated by a dashed line in FIG. 3. That is, the responsiveness of actual torque with respect to the torque demand can be made into a fixed responsiveness without depending on the engine rotational speed.

Figure 4:
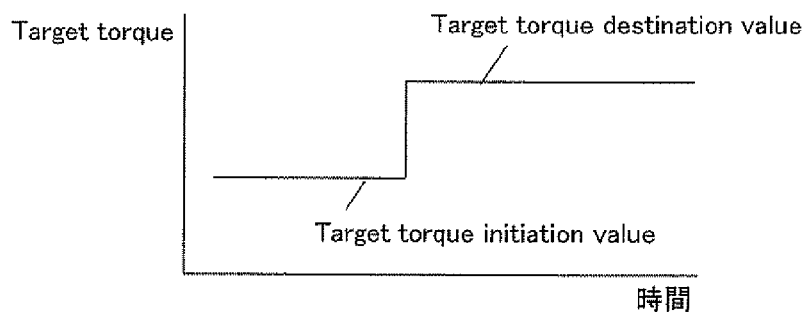
FIG. 4 is a figure for explaining the term on setting of a target torque.

The control device of the present embodiment is designed to change the correction factor k, which controls the time constant $kT_o$, according to the operating conditions of the internal-combustion engine. Specifically, the correction factor k is determined based on the engine rotational speed of the internal-combustion engine, the target torque initial value and the target torque destination value. This is because the engine rotational speed of the internal-combustion engine and the difference of the target torque initial value and the target torque destination value are operating conditions which affect the intake response time constant greatly in various kinds of operating conditions. FIG. 4 is a figure illustrating the meaning of the target torque initial value and the target torque destination value. The target torque initial value means the value of the target torque at present, and the target torque destination value means the value of the target torque set newly.

Figure 5:
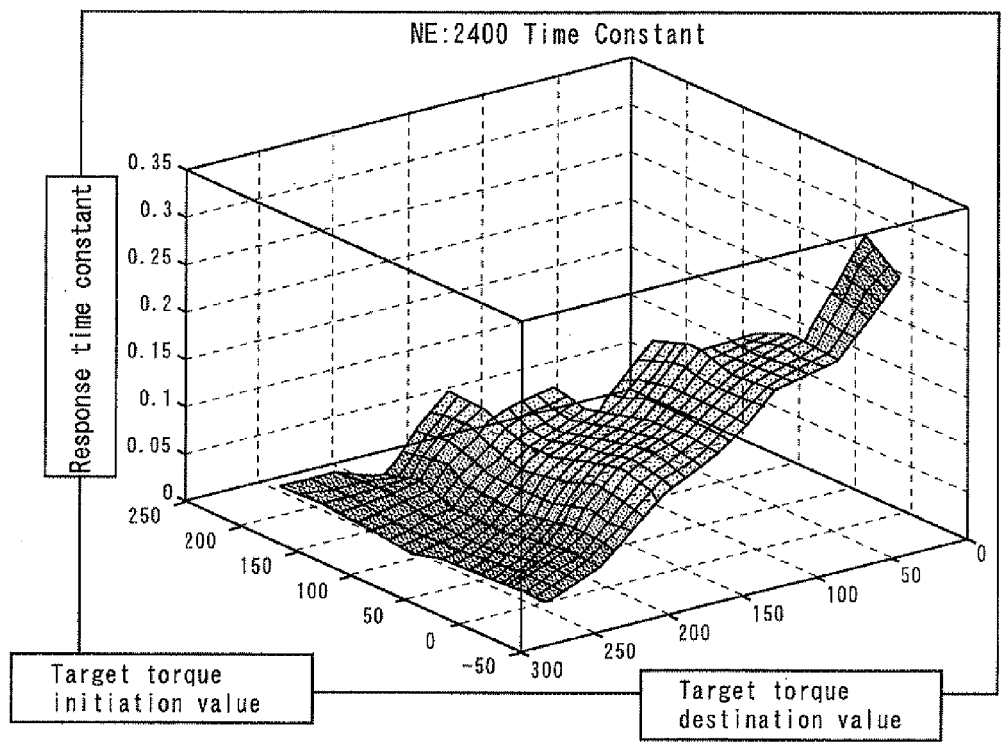
FIG. 5 is a figure for explaining the influence which the difference of a target torque initial value and a target torque destination value has on the torque response.
Figure 6:
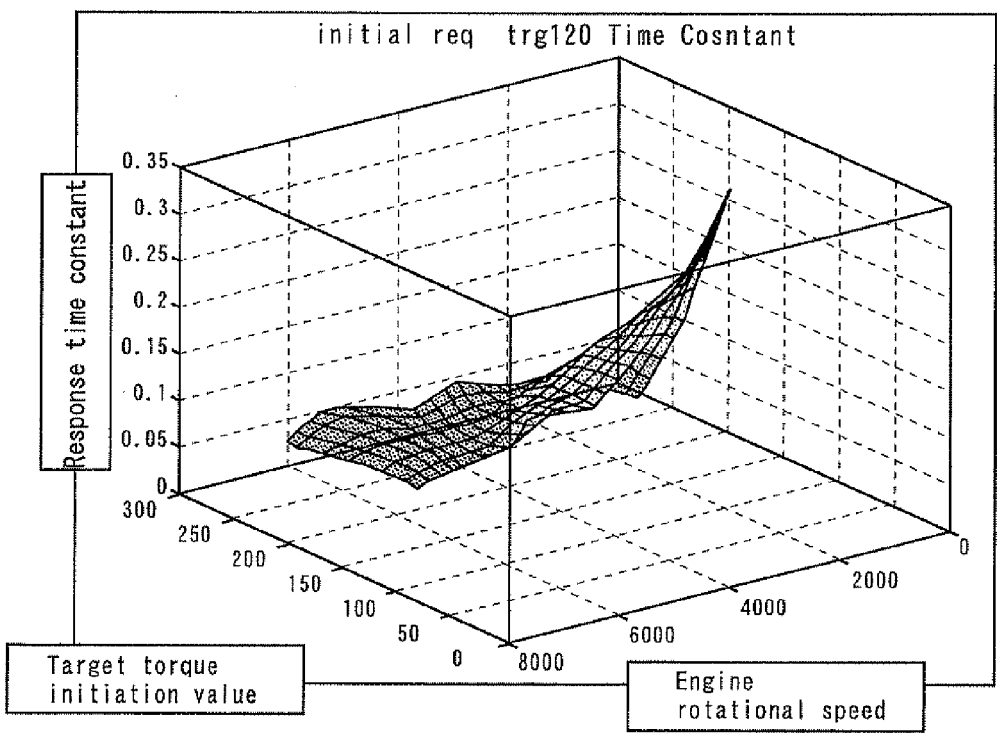
FIG. 6 is a figure for explaining the influence which the engine rotational speed and the target torque destination value have on the torque response.

FIG. 5 is a three-dimensional graph showing the relation between the intake response time constant and the difference of the target torque initial value and the target torque destination value at fixed engine rotational speed. FIG. 6 is a three-dimensional graph showing the relations among the intake response time constant, the target torque destination value and the engine rotational speed at fixed target torque initial value. As will be understood from these graphs, the larger the engine rotational speed is or the larger the difference of the target torque initial value and the target torque destination value is, the smaller the intake response time constant becomes. Correcting the time constant $kT_o$ by the correction factor k is performed so that such a change of the intake response time constant may be negated.

A correction factor map 8 is used for setting the correction factor k. The correction factor map 8 is a map which has the engine rotational speed of the internal-combustion engine, the target torque initial value and the target torque destination value as parameters, and outputs the correction factor k according to those input values. The correction factor k is set to zero, which is the minimum of the correction factor k, on the conditions where the response of torque with respect to the actuation of the throttle 2 becomes the slowest. Contrary to the case of the intake response time constant, the larger the engine rotational speed is or the larger the difference of the target torque initial value and the target torque destination value is, the larger value the correction factor k is set to. This means that the correction factor k is set so that standard responsiveness, which is the responsiveness when the response of torque with respect to the actuation of the throttle 2 is the slowest, may be realized also on the other conditions.

Figure 7:
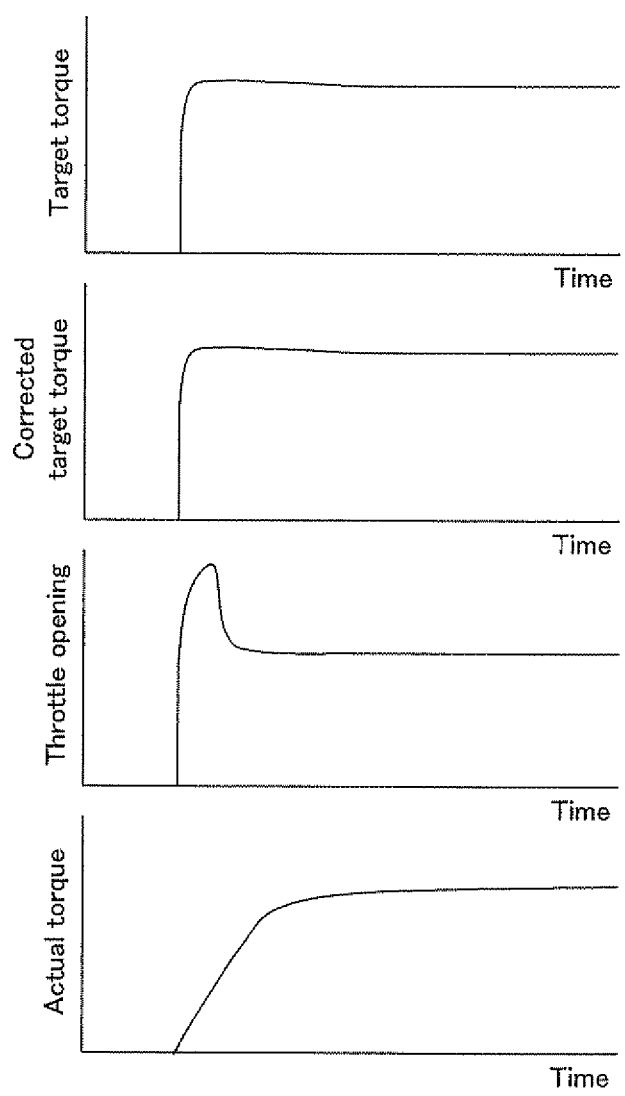
FIG. 7 is a figure showing the operation at low rotational speed when the internal-combustion engine is controlled by the method explained by FIG. 3.
Figure 8:
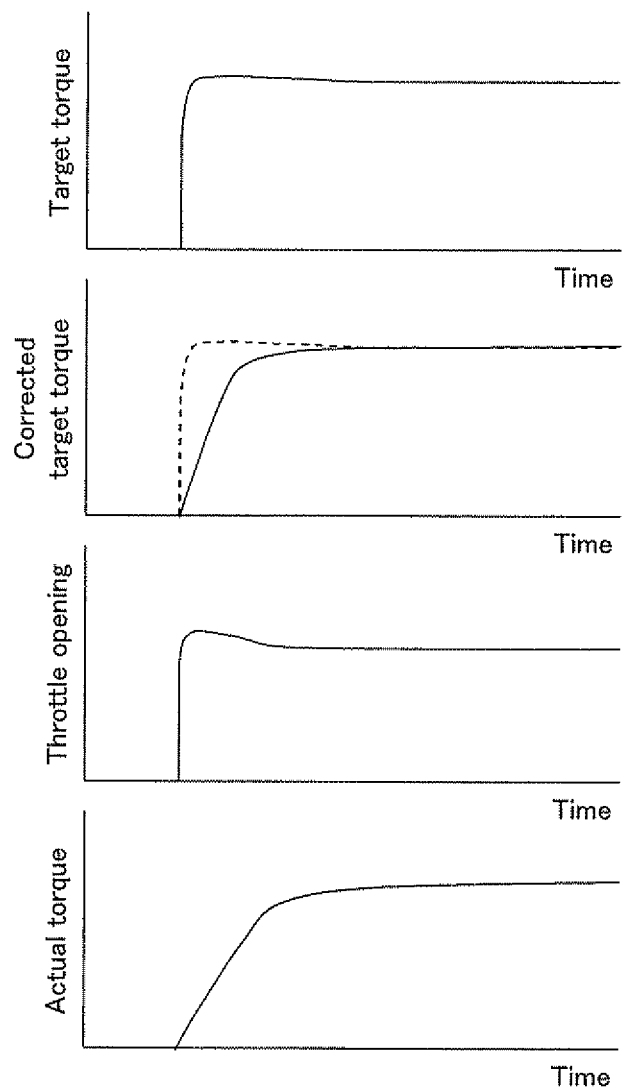
FIG. 8 is a figure showing the operation at middle rotational speed when the internal-combustion engine is controlled by the method explained by FIG. 3.
Figure 9:
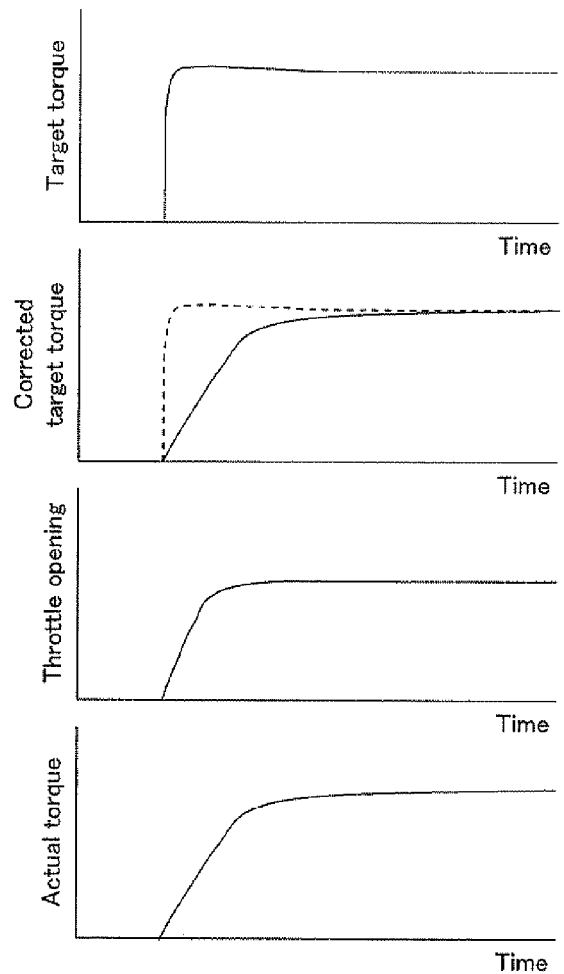
FIG. 9 is a figure showing the operation at high rotational speed when the internal-combustion engine is controlled by the method explained by FIG. 3.

With the configuration and function explained above, when the internal-combustion engine is controlled by the control device of the present embodiment, operations as shown in FIGS. 7 to 9 can be realized. In each figure of FIGS. 7 to 9, the top graph shows the time variation of the target torque set by the target torque set part 4. The second graph shows the time variation of the corrected target torque obtained by letting the target torque shown in the top graph pass in the response compensating filter 6. The third graph shows the time variation of the throttle opening realized by inputting into the air inverse model 10 the corrected target torque shown in the second graph. And, the bottom graph shows the time variation of the actual torque realized by the actuation of the throttle 2 shown in the third graph.

The operation shown in each figure of FIGS. 7 to 9 is operation realized on different operating conditions, respectively. FIG. 7 shows the operation realized on the conditions where the response of torque with respect to the actuation of the throttle 2 is the slowest (the slowest response conditions). On the other hand, FIG. 8 shows the operation realized on the conditions where the response of torque with respect to the actuation of the throttle 2 is slightly slow (slow response conditions). FIG. 9 shows the operation realized on the conditions where the response of torque with respect to the actuation of the throttle 2 is fast (fast response conditions). Here, it is presupposed that the initial value and destination value of the target torque are common to each response conditions and only engine rotational speed differs.

First, in the slowest response conditions shown in FIG. 7, the target torque set by the target torque set part 4 is input into the air inverse model 10 as it is, as will be understood by comparing the top graph with the second graph. As mentioned above, it is because the correction factor k of the response compensating filter. 6 is set to zero. As a result, the throttle opening computed by the air inverse model 10 comes to behave in a way that it overshoots a final target opening and then converges on the final target opening, as shown in the third graph.

Next, in the slow response conditions shown in FIG. 8, the corrected target torque input into the air inverse model 10 has the response delayed with respect to the target torque set by the target torque set part 4, as shown in the second graph. It is because the correction factor k of the response compensating filter 6 is set to a larger value than zero. As a result, it is suppressed for the throttle opening computed by the air inverse model 10 to overshoot the final target opening, as shown in the third graph.

And, in the fast response conditions shown in FIG. 9, the corrected target torque input into the air inverse model 10 has the response further delayed with respect to the target torque set by the target torque set part 4, as shown in the second graph. It is because the correction factor k of the response compensating filter 6 is set to a larger value than the value in the slow response conditions. As a result, the throttle opening computed by the air inverse model 10 comes to behave in a way that it converges on the final target opening without overshooting the final target opening, as shown in the third graph.

As a result of the throttle opening's showing the above time variation on each of the response conditions, the time variation of the actual torque realized by the actuation of the throttle 2 becomes almost the same time variation regardless of the difference of the response conditions (in this case, the difference of engine rotational speed), as will be understood by comparing the bottom graphs of FIGS. 7-9.

According to the control device of the present embodiment, the responsiveness of actual torque with respect to the torque demand is made uniform with the responsiveness of torque in the slowest response conditions without depending on the operating conditions of the internal-combustion engine, as will be understood from the above descriptions about the concrete operations. Thus, by making the torque responsiveness uniform regardless of the operating conditions of the internal-combustion engine, the design of the control system for the overall integrated control of the vehicle and the fitting work for it can be made more efficient.

When this control device is applied to a real vehicle, the torque responsiveness becomes no longer affected by the operating conditions of the internal-combustion engine, and thereby the overall control performance of the vehicle can be improved. To give a concrete example, when a slip is happening, the TRC applies brakes to the driving wheels while reducing the power output of the power train including the internal-combustion engine, and thereby controls the slip. If the power output response characteristic of the power train is not uniform at this time, engine stall can be caused by the excessive drop of the power output when the power output response speed of the power train is high. Conversely, when the power output response speed of the power train is low, quick slip control may be interfered with by the delay in decreasing the power output. According to the control device of the present embodiment, since the torque responsiveness cannot be depended on the operating conditions of the internal-combustion engine but can be made uniform, the above situations can be prevented.

In the present embodiment, the target torque set part is equivalent to the "target torque set means" of the first aspect of the present invention. The air inverse model 10 is equivalent to the "conversion means" of the first aspect of the present invention. And the "target torque correction means" of the first aspect of the present invention is constituted by the response compensating filter 6 and the correction factor map 8. The response compensating filter 6 is equivalent to the "first-order-lag filter" of the seventh aspect of the present invention, and the correction factor map 8 is equivalent to the "time constant change means" of the seventh aspect of the present invention.

By the way, according to the configuration of the control device shown in FIG. 1, the responsiveness of actual torque with respect to the torque demand can also be actively changed based on the operating conditions. According to the present embodiment, as shown in FIG. 3, the time constant of the first-order-lag element by which the response of actual torque with respect to the torque demand is approximated is set constant. However, it is possible to change suitably the time constant $kT_o$ of the response compensating filter 6 according to the operating conditions, and thereby it becomes possible to adjust the torque responsiveness according to the operating conditions of the internal-combustion engine.

Figure 10:
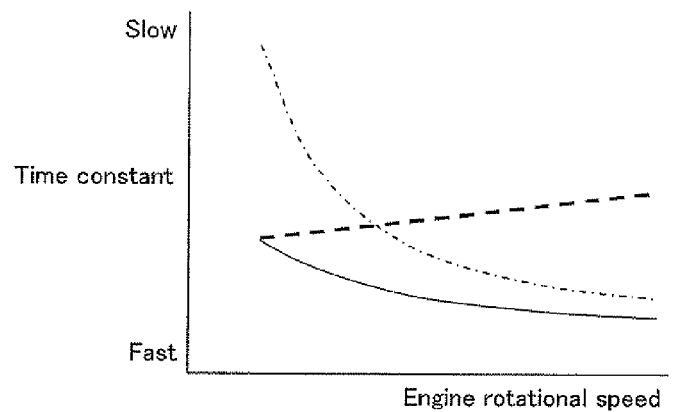
FIG. 10 is a figure for explaining the modification of the torque response characteristic realized with the configuration of the first embodiment of the present invention.

For example, if the correction factor map 8 which specifies the relation between the operating conditions and the correction factor k is designed suitably, the relation between the time constant and the operating conditions (in this case, engine rotational speed) as shown with a dashed line in FIG. 10 can also be obtained. According to the relation shown in FIG. 10, the time constant is enlarged as the engine rotational speed becomes high. Such a torque response characteristic is effective when operating the ACC on the highway. Since the torque response is more reduced in higher rotational speed range, shock-less smooth responsiveness can be obtained.

The relations between the time constant and the operating conditions which are shown by a solid line and a dashed-dotted line in FIG. 10 are the same as what are shown in FIG. 3.

The relation between the time constant and the operating conditions which is shown with the dashed line in FIG. 10 is an example of the relation which can be realized by the configuration of the control device shown in FIG. 1. Since the time constant $kT_o$ of the response compensating filter 6 can be arbitrarily determined by the design of the correction factor map 8, the relation between the time constant and the operating condition can also be adjusted arbitrarily. However, since the time constant corresponding to the solid line in FIG. 10 is the minimum time constant realizable on each of the operating conditions, it is impossible to adjust the time constant to a smaller time constant than the time constant corresponding to the solid line. In other words, a larger time constant than the time constant corresponding to the solid line in FIG. 10 cane be realized arbitrarily according to the setting of the time constant $kT_o$ of the response compensating filter 6.

Second Embodiment

Next, the second embodiment of the present invention will be described with reference to figures.

According to the control device of the first embodiment explained previously, the responsiveness of actual torque with respect to the torque demand is made uniform without depending on the operating conditions of the internal-combustion engine. However, it comes to be adjusted to the torque responsiveness in the slowest response condition, so the overall torque responsiveness is suppressed to slightly low responsiveness. The present embodiment is the further improvement of the first embodiment, and is characterized by the realization of high torque responsiveness.

Figure 11:
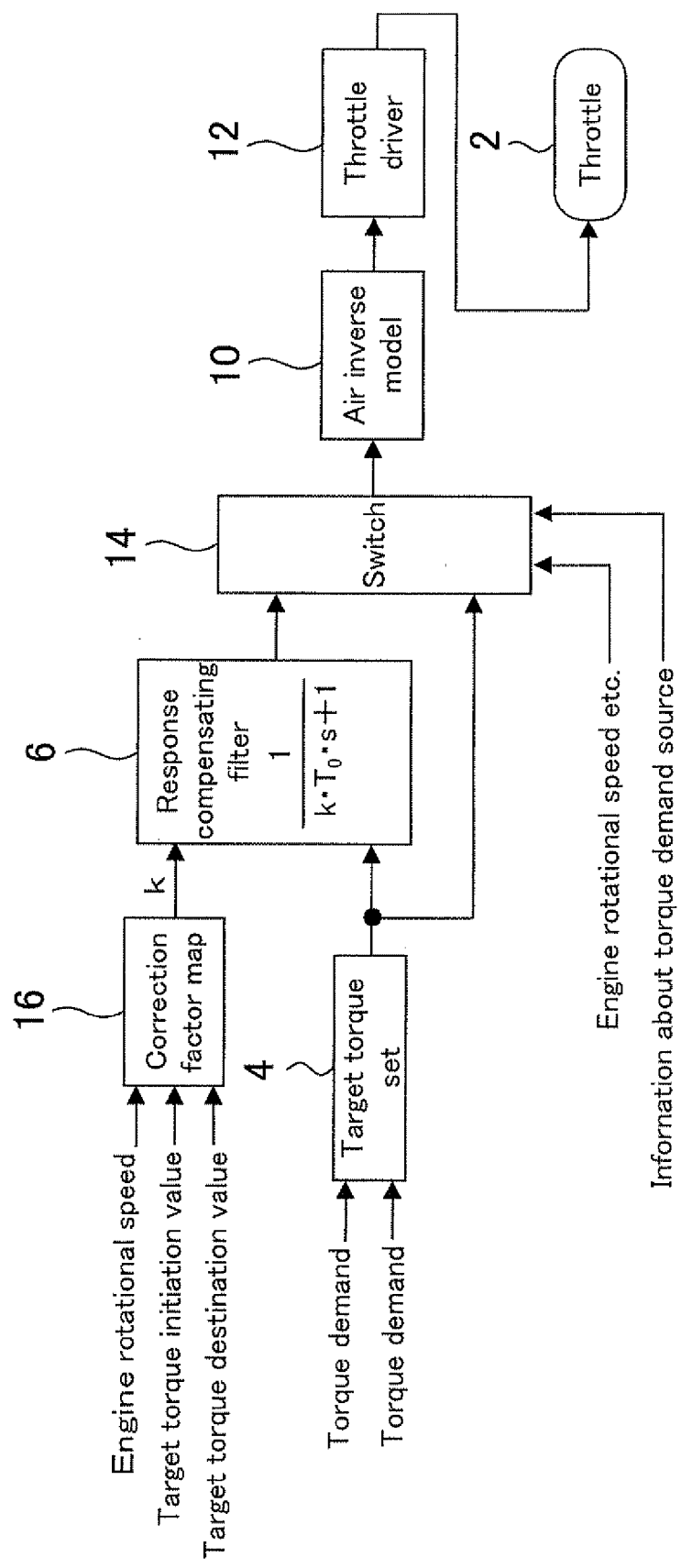
FIG. 11 is a block diagram showing the configuration of a control device for an internal-combustion engine as a second embodiment of the present invention.

FIG. 11 is a block diagram showing the configuration of the internal-combustion engine as the second embodiment of the present invention. The control device of the present embodiment is configured on the basis of, the configuration of the control device of the first embodiment, and is added new functions to. In FIG. 11, elements which are common with the first embodiment are attached the same numerals to. The configuration of the control device of the present embodiment will be explained below with reference to FIG. 11. However, elements similar to those of the control device according to the first embodiment will be described only briefly or omitted entirely, whereas elements different from those of the control device according to the first embodiment will be described in detail.

The control device of the present embodiment is configured on the basis of the configuration of the control device of the first embodiment, and is added a switch 14 to between the response compensating filter 6 and the air inverse model 10. The target torque filtered by the response compensating filter 6 and the original target torque set by the target torque set part 4 are input into the switch 14 as input signals. The switch 14 can change the signal input into the air inverse model 10 between these two kinds of signals.

The switch 14 changes the signal input according to a change judgment performed internally. The engine rotational speed is used as information for the change judgment. The switch 14 changes the signal input to the corrected target torque in the high rotational speed range where the engine rotational speed is higher than a reference rotational speed Ne0, and changes the signal input to the original target torque in the low rotational speed range where the engine rotational speed is lower than the reference rotational speed Ne0. The reference speed Ne0 can be set to an arbitrary rotational speed which is lower than the maximum rotational speed and higher than the minimum rotational speed. According to the present embodiment, the lower limit of the rotational speed range used normally is set as the reference rotational speed Ne0.

The switch 14 also uses information regarding which torque demand source is generating the torque demand as information for the change judgment. The switch 14 determines whether a predetermined particular torque demand source is generating the torque demand. When the torque demand is generated from the particular torque demand source, the switch 14 changes the signal input to the original target torque. The term "particular torque demand source" here means a torque demand source which does not need that the torque responsiveness is uniform, but needs that the torque responsiveness is high as much as possible.

The information about vehicle conditions is also used as information for the change judgment of the switch 14. For example, the yaw rate of the vehicle may be used. It is also possible to change the switch 14 in accordance with whether the value of the yaw rate has exceeded a threshold.

Figure 12:
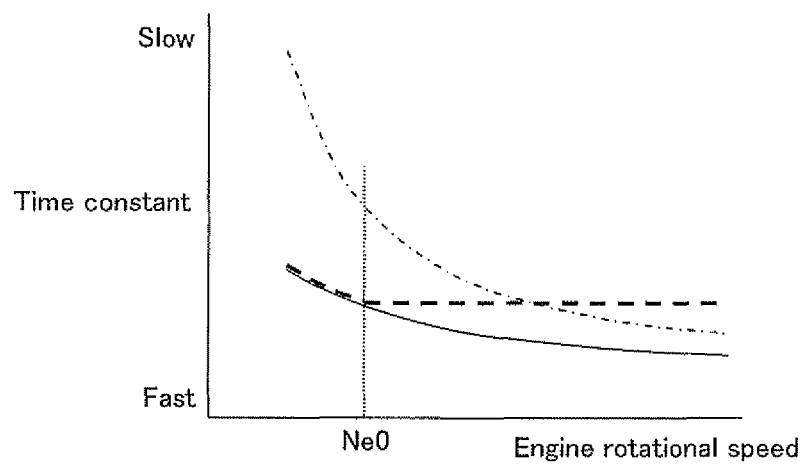
FIG. 12 is a figure for explaining the torque response characteristic realized with the configuration of the second embodiment of the present invention.

FIG. 12 is a figure showing the torque response characteristic realized by operating this switch 14. FIG. 12 shows with a graph how the time constant of the first-order-lag element by which the response of actual torque with respect to the torque demand is approximated changes with the engine rotational speed of the internal-combustion engine. Each of the relations between the time constant and the engine rotational speed which are indicated by a solid line and dashed-dotted line in FIG. 12 is the same as what is shown in FIG. 3. Since the signal input into the air inverse model 10 is changed to the original target torque by the switch 14 when the torque demand is generated from the particular torque demand source, the relation between the time constant and the engine rotational speed turns into the relation indicated by the solid line.

The switch 14 is changed in accordance with whether the engine rotational speed is larger than the reference rotational speed Ne0 when the torque demand is not generated from the particular torque demand source. The correction factor map 16 of the present embodiment is designed so that the minimum time constant that can be realized when the engine rotational speed is the reference rotational speed Ne0 becomes a standard time constant. By this, in the high rotational speed range where the switch 14 operates to change the signal input into the air inverse model 10 to the correction target torque, the time constant is made uniform with the standard time constant regardless of the engine rotational speed as indicated by the dashed line in the figure.

As mentioned above, according to the control device of the present embodiment, in the high rotation speed range where the engine rotational speed is more than the reference rotational speed Ne0, the responsiveness of actual torque with respect to the torque demand is made uniform with the torque responsiveness at the reference rotational speed Ne0. Since the time constant at the reference rotational speed Ne0 is lower than the time constant at the minimum rotational speed as shown in FIG. 12, the torque responsiveness realized by the present embodiment becomes higher than the torque responsiveness realized by the first embodiment. In the present embodiment, the torque responsiveness in the rotational speed range lower than the reference rotational speed Ne0 changes according to the engine rotational speed. However, since the reference rotational speed Ne0 is set to the lower limit of the rotational speed range used normally, it is not a substantial disadvantage that the torque responsiveness is not uniform in the range lower than the reference rotational speed Ne0.

According to the control device of the present embodiment, when torque demands include a torque demand from the particular torque demand source, the original target torque which is not corrected by the response compensating filter 6 is input into the air inverse model 10. This makes the torque responsiveness change according to the operating conditions of the internal-combustion engine. As a result, the higher the engine rotational speed is, the higher the torque responsiveness becomes.

In the present embodiment, the target torque set part 4 is equivalent to the "target torque set means" of the first aspect of the present invention. The air inverse model 10 is equivalent to the "conversion means" of the first aspect of the present invention. And the "target torque correction means" of the first aspect of the present invention is constituted by the response compensating filter 6 and the correction factor map 16. The response compensating filter 6 is equivalent to the "first-order-lag filter" of the seventh aspect of the present invention, and the correction factor map 16 is equivalent to the "time constant change means" of the seventh aspect of the present invention. The switch 14 is equivalent to the "correction limit means" of the second aspect of the present invention and the "correction permission means" of the third and fourth aspects of the present invention.

Others

While the present invention has been described in terms of embodiments, it should be understood that the invention is not limited to the embodiments described above, and that variations may be made without departure from the scope and spirit of the invention. For example, the following modifications can be made to the preferred embodiments of the present invention.

According to the first embodiment, the correction factor k for correcting the time constant $kT_o$ of the response compensating filter 6 is obtained from the one correction factor map 8. However, two or more correction factor maps may be installed and used by switchover. In this case, the relation between the operating conditions of the internal-combustion engine and the correction factor should be changed for every correction factor map. This makes it possible to change the torque responsiveness of the internal-combustion engine by selecting a correction factor map. Switching between correction factor maps may be conducted according to the operating condition of the internal-combustion engine, and may be conducted by which torque demand source is generating the torque demand. The same applies to the second embodiment; two or more correction factor maps may be installed and used by switchover. For example, the correction factor map 8 used by the first embodiment may be installed in addition to the correction factor map 16, and they may be used by switchover.

Figure 13:
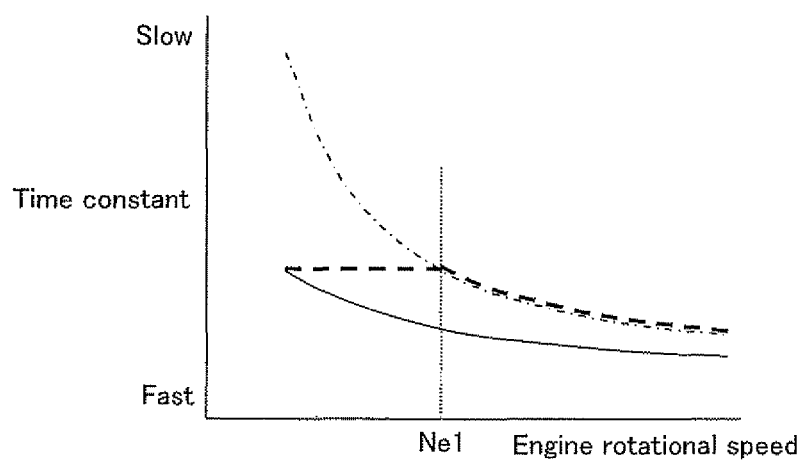
FIG. 13 is a figure for explaining the modification of the torque response characteristic realized with the configuration of the second embodiment of the present invention.

According to the configuration of the control device shown in FIG. 11, the relation between the time constant and the operating conditions (in this case, engine rotational speed) as indicated by a dashed line in FIG. 13 can also be obtained by the design of the air inverse model 10, the design of the correction factor map 16, and the method of the change judgment by the switch 14. Each of the relations between the time constant and the engine rotational speed which are indicated by a solid line and dashed-dotted line in FIG. 13 is the same as what is shown in FIG. 3. When realizing the relation shown in FIG. 13, in the high rotational speed range where the engine rotational speed is higher than or equal to the reference rotational speed Ne1, an air inverse model which is capable of realizing the relation indicated by the dashed-dotted line in FIG. 13 is used, and the original target torque is input into the air inverse model. In the low rotational speed range where the engine rotational speed is lower than the reference rotational speed Ne1, an air inverse model which is capable of realizing the relation indicated by the solid line in FIG. 13 is used, and the target torque which is corrected by the response compensating filter is input into the air inverse model.

According to the above-mentioned embodiment, the control device controls the actuation of the throttle. However, the actuator which serves as a controlled object in the present invention is not limited to the throttle. If the torque responsiveness with respect to the actuation of a certain actuator changes with the operating conditions of the internal-combustion engine, the present invention is applicable to the control of the certain actuator.

DESCRIPTION OF NOTATIONS

2 Throttle
4 Target torque set part
6 Response compensating filter
8 Correction factor map
10 Air inverse model
12 Throttle driver
14 Switch
16 Correction factor map

The invention claimed is:

1. A control device of an internal-combustion engine which is provided with an actuator actuated in response to an input of a control signal, wherein the torque output from said internal-combustion engine is adjusted in accordance with the actuation of said actuator and the responsiveness of torque with respect to the actuation of said actuator changes with the operating conditions of said internal-combustion engine, said control device comprising:
   target torque set means which sets a target torque of said internal-combustion engine based on a torque demand outputted from one or a plurality of torque demand sources;
   conversion means which converts the target torque into the control signal for said actuator; and
   target torque correction means which corrects the target torque input into said conversion means by use of a first-order-lag filter when said internal-combustion engine is operated in a rotational speed range higher than a predetermined reference rotational speed, wherein the higher the engine rotational speed is than said reference rotational speed, the more said target torque correction means enlarges the time constant of said first-order-lag filter, so that the responsiveness of actual torque with respect to the torque demand is adjusted to certain fixed responsiveness without depending on the engine rotational speed.

2. The control device for the internal-combustion engine according to claim 1, further comprising:
   correction limit means which judges whether the torque demand used for setting the target torque includes a component generated from a particular torque demand source which needs that the responsiveness of torque is high, and limits the target torque correction by said target torque correction means when the component generated from the particular torque demand source is included in the torque demand.

* * * * *